United States Patent [19]

Veligdan

[11] Patent Number: 5,233,176
[45] Date of Patent: Aug. 3, 1993

[54] PRECISION LASER SURVEYING INSTRUMENT USING ATMOSPHERIC TURBULENCE COMPENSATION BY DETERMINING THE ABSOLUTE DISPLACEMENT BETWEEN TWO LASER BEAM COMPONENTS

[75] Inventor: James T. Veligdan, Manorville, N.Y.

[73] Assignee: Associated Universities, Inc., Washington, D.C.

[21] Appl. No.: 929,585

[22] Filed: Aug. 17, 1992

[51] Int. Cl.$^5$ .............................................. G01J 40/14
[52] U.S. Cl. .................................. 250/206.2; 356/400
[58] Field of Search .......................... 250/206.1, 206.2; 356/400, 141, 152

[56] References Cited

U.S. PATENT DOCUMENTS 3,894,230  7/1975  Rorden et al. ...................... 356/400
3,915,574  10/1975  Hernquist ............................ 356/400

OTHER PUBLICATIONS

"Geodetic Refraction, Effects of Electromagnetic Wave Propagation Through the Atmosphere", Edited by F. K. Brunner, Pringer-Verlag, Berlin, Heidelberg, New York, Tokyo, 1984, pp. 1, 9 and 12-31.
"Anti-Missile Technology Delights Astronomers" by Malcolm W. Browne, New York Times, May 6, 1991.

Primary Examiner—David C. Nelms
Assistant Examiner—T. Davenport
Attorney, Agent, or Firm—Margaret C. Bogosian

[57] ABSTRACT

Atmospheric effects on sighting measurements are compensated for by adjusting any sighting measurements using a correction factor that does not depend on atmospheric state conditions such as temperature, pressure, density or turbulence. The correction factor is accurately determined using a precisely measured physical separation between two color components of a light beam (or beams) that has been generated using either a two-color laser or two lasers that project different colored beams. The physical separation is precisely measured by fixing the position of a short beam pulse and measuring the physical separation between the two fixed-in-position components of the beam. This precisely measured physical separation is then used in a relationship that includes the indexes of refraction for each of the two colors of the laser beam in the atmosphere through which the beam is projected, thereby to determine the absolute displacement of one wavelength component of the laser beam from a straight line of sight for that projected component of the beam. This absolute displacement is useful to correct optical measurements, such as those developed in surveying measurements that are made in a test area that includes the same dispersion effects of the atmosphere on the optical measurements. The means and method of the invention are suitable for use with either single-ended systems or a double-ended systems.

17 Claims, 3 Drawing Sheets

ERROR = ∫(D)

PRECISION LASER SURVEYING INSTRUMENT USING ATMOSPHERIC TURBULENCE COMPENSATION BY DETERMINING THE ABSOLUTE DISPLACEMENT BETWEEN TWO LASER BEAM COMPONENTS

TECHNICAL FIELD OF THE INVENTION

The present invention relates to the general art of geometric and geodetic instruments, and to the particular field of devices and methodology used to provide precision pointing accuracy for geometric instruments.

BACKGROUND OF THE INVENTION

Since light passing through the atmosphere encounters a phenomenon known as dispersion, which is simply a separation of light into rays of differing wavelengths as a consequence of their respective indexes of refraction, the accuracy of any geometric and geodetic measurement made using optical techniques based on light beams or sighting paths through a given atmosphere has always been limited and influenced by a variety of atmospheric effects. These effects generally include atmospheric turbulence as well as density and temperature gradients, and other physical property variations existing in the path of a sight line or measurement beam. The refractive index of an atmosphere on a given wavelength affects the accuracy and precision of such sightings or measurements in several ways, including effectively bending the ideally straight line of sight for a projected beam or sight path away from a "true" line of sight to the target. Therefore, a pointing error is usually introduced into any measurement made with an optical instrument where at least some portion of the measurement is optically made through the atmosphere. A simplified illustration of this kind of error is shown in FIG. 1 wherein a target T located in plane T' is sighted, from an origin point O, at a location that appears to be displaced by a distance D from the truly straight line of sight TS between point O and target T. Thus, it is clear that a correction of the sighting error to determine a truly straight line of sight despite the effects of dispersion and diffusion in the atmosphere between point O and target T is needed to correct for the displacement distance D.

The prior art has included several proposals for compensating for such pointing or sighting errors. These proposals have included methods that sight to two staffs equidistant from an origin and take reciprocal sightings from both ends of the lines of sight. However, these techniques generally assume that the index of refraction is uniform along the optical paths, and remains so during the different sightings. Such an assumption is usually not valid, especially if atmospheric turbulence exists in the lines of sight. It is well known that certain forms of correction factors can be applied to partially cure the dispersion effects, but the accuracy and precision of such techniques are not sufficient for many high-precision measurement applications.

Accordingly, the art has also included techniques to minimize the physical conditions that create the variables. For example, one technique includes the use of fans to homogenize the atmospheric effects in the test area. However, micro and macro turbulence still exists along the sight path and can impose a severe limit on the pointing accuracy of measurements made using such devices.

Other techniques known in the art use two wavelengths to compensate for atmospheric refraction. The techniques using two wavelengths generally incorporate the difference between the arrival angles of the two wavelengths to obtain a correction factor to be applied in determining the true line of sight. A summary of such techniques was published in 1984 by Springer-Verlag of Berlin, Heidelberg, New York and Tokyo under the title, "Geodetic Refraction Effects of Electromagnetic Wave Propagation Through the Atmosphere," edited by F. K. Brunner. Several of the authors mentioned in this summary are referred to below (with their names being underlined and the year dates of their edited publications being shown in parentheses). Techniques, such as disclosed in the Brunner-edited publication by Khvostikov (1946), Tengstrom (1967), and Tengstrom (1977), generally include the use of interferometry, and usually do so in a time averaged manner. Even with time averaging, such techniques are still subject to the variations of atmospheric properties because averaging cannot sufficiently resolve the effects of dispersion to provide precise accuracy for the measurements. In addition to the foregoing shortcomings in degrees of accuracy achievable with these techniques, they, along with techniques that use geodetic theodolites, such as are disclosed by Vshivkov and Shilkin, Startsev and Tukh (1955); as well as techniques such as disclosed by Brein and Glissmann (1970, 1976) that require the use of two large telescopes; or techniques such as disclosed by Dyson and Williams (1972-1981) and Astheimer and McHenry (1969) that use a rotating grating to scan an image with a moving pattern of alternative transparent and opaque lines; as well as techniques such as disclosed by Mikhailov (1975) that use optical birefringence in blocks of natural quartz, inherently include set-up and operational complexities that are not desirable.

A further technique known in geodetic measurement art includes the propagation of two beam colors, each through a separate parcel of the atmosphere. In some cases, this technique may even exacerbate the above-mentioned problems associated with atmospheric variables since additional parcels of the atmosphere, and their concomitant variables, are introduced into the measurement relationships.

Other known geodetic measurement techniques are double-ended. That is, they require the source and the receiver to be located at opposite ends of the measuring area. This kind of arrangement may introduce logistic and operational problems along with the just-discussed measuring problems, so it is often preferable to user a single-ended system, provided there is no resultant loss of measurement accuracy.

Still another known technique, developed for the U.S. Government Strategic Defense Initiative (SDI) for tracking missiles, is single-ended. That is, a measuring device and a beam generator are located on the same side of the test area. This technique measures the amount of displacement undergone by a laser beam from its source to a target or measuring plane, such as that formed by a missile in space. A beam splitter directs a return beam from the target missile, and the initial beam, to a sensor which reads the average amount of displacement and analyzes it using a computer. However, this SDI technique, so far as it is generally understood, as indicated above is probably extremely expensive and difficult to set up and operate and it apparently uses continuous laser beams, so some sort of time averaging of beam displacement is most likely employed to determine average displacement of the projected and reflected beams.

It should be understood from the foregoing discussion of the prior art geodetic measuring apparatus and methods that there is still a need for more accurate means and a methods for making measurements using an optical technique that overcome a atmosphere-associated errors, yet is easy to set up and operate relative to other means and methods presently known in the art. There is also a need for a better means and method for very accurately determining a straight light beam path using optical sighting techniques, somewhat similar to those used in surveying procedures, for example, that are easily effected yet are not faulted by errors due to atmospheric conditions existing in the measuring area.

OBJECTS OF THE INVENTION

A main object of the invention is to provide a means and a method for determining a truly straight line of sight in an optical measuring technique.

Another object of the invention is to provide a means and a method for determining a straight line of sight in an optical measuring technique such that the determined line is not faulted by errors associated with atmospheric conditions existing in the measuring area during the measurement.

Yet another object of the invention is to provide a single-ended means and a method for determining a straight line of sight in an optical measuring technique such that the determining line is not faulted by errors associated with atmospheric conditions existing in the measuring area during the measurement.

A further object of the invention is to provide a means and a method for determining a straight line of sight in an optical measuring technique that are easy to set up, operate and control as compared to prior art means and methods.

A specific object of the invention is to provide a means and a method for more accurately determining a straight line of sight in an optical geodetic surveying procedure.

It is another specific object of the present invention to provide a means and a method for determining a truly straight line of sight in a space satellite vehicle tracking procedure.

Additional objects and advantages of the invention will be apparent from the description of it presented herein.

SUMMARY OF THE INVENTION

These, and other, objects are achieved by very accurately measuring the dispersion effect physical separation between two components of a thin and short pulse of light traveling through a medium, such as the atmosphere, that is subject to turbulence and other dispersion and diffusion effects, and using this measurement to determine a straight line or projection path for the light pulse. The pulse of light is preferably generated by a two-color laser. This pulse is made short enough to effectively "freeze" or fix in position the separated components of the pulse at the plane where that separation is measured, and the pulse is made thin or narrow enough to provide precise points for measuring displacement, thereby affording a means for negating most of the dispersion and diffusion effects of the atmosphere and atmospheric motion in a test area. The means and method of the present invention use the information gained from accurately measuring the separation of narrow different color components of the "frozen" or fixed in place pulse caused by the conditions of the medium through which the pulse travels, to determine both the direction and magnitude of the deviation of the light pulse from a straight line of sight. The amount of deviation from the determined straight line of sight is calculated in terms of the relative dispersion between the different color components of the light pulse using the following generalized relationship:

$$D_1 = \Delta/(1 - n_1/n_2)$$

where $D_1$ is the absolute displacement from a straight line of sight of a first component or portion of the light pulse having a first wavelength, $n_1$ is a refractive index of the medium through which said pulse is propagated for the first component wavelength of the pulse, $n_2$ is a refractive index of the medium through which said pulse is propagated for a second component wavelength of the pulse, and $\Delta$ is the dispersion effect physical separation accurately measured at the plane of measurement, between the two separated color components of the light pulse. The subscripts 1 and 2 represent the two discrete wavelength components of the beam or pulse of light, such as red and blue color components.

Because of the form of this relationship, any dependence of the indexes of refraction for the color components of the light pulse on temperature, pressure or other physical state property in the path of the pulse is essentially factored out. Therefore, only an average value for the indexes of refraction of the medium through which the light pulse components are traveling is required to accurately determine the absolute displacement of the beam components from a truly straight line of sight path for the beam. Such average values of refraction indexes can be found in standard textbooks or standard reference books.

This absolute displacement can then be applied, e.g., by an arithmetic operation, to other measurements made in that test area to correct those measurements to determine a straight true line of sight for the beam.

In the preferred embodiment of the invention, the light pulse is generated by a suitable conventional two color laser. The physical separation between the two colors in the light pulse is very accurately measured. To achieve such an accurate measurement by practicing the present invention there is provided a position fixing means that is operable to fix the positions of the color components of the beam at a predetermined plane, so that the separation between those components can be accurately measured at that plane. Use of this position fixing means obviates the need for time averaging the dispersed, diffused and continuously changing multiple positions of such beam components in the manner relied on by prior art devices and techniques for attempting to accurately measure the positions of projected light beams. One suitable position fixing means that may be used in practicing the invention is to provide a conventional chopper for shortening the duration of the laser light pulse that is projected from a two-color laser in the manner explained above. An alternative suitable position fixing means that may be used in practicing the invention in applications wherein relatively long pulses of two-color laser light are used, is to provide a Charge Coupled Device (CCD) camera with a computer controlled frame "grabber" that operates to instantaneously capture the respective positions of the beam color components each time the "grabber" is actuated. Such alternative position fixing means are more fully described below in connection with the disclosure of the detailed features of the preferred embodiment of the invention. In one embodiment, a computer is operably connected to such CCD camera which is provided with suitable software to convert signals from the CCD camera into signals corresponding to the precisely measured separation between the two narrow, fixed-in-position color components of the light beam. This precise physical measurement is used in a further computer calculation to determine the absolute displacement of one color component of the projected pulse from its truly straight path to the plane of measurement. This absolute displacement factor can then be used to correct other measurements made in the same medium and measurement field.

Ambient conditions, such as turbulence, state condition gradients, and the like, existing in the measurement field during a measurement do not affect the measurement upon which the correction to a nearly straight line of sight is based. Still further, errors that may be introduced into the determination of absolute displacement due to use of multiple parcels of the atmosphere into a test measurement are largely avoided in the means and method of the present invention because both color components of the projected beam are initially positioned co-linearly.

BRIEF DESCRIPTION OF THE DRAWING FIGURES

DETAILED DESCRIPTION OF THE PREFERRED EMBODIMENT OF THE INVENTION

Figure 2:
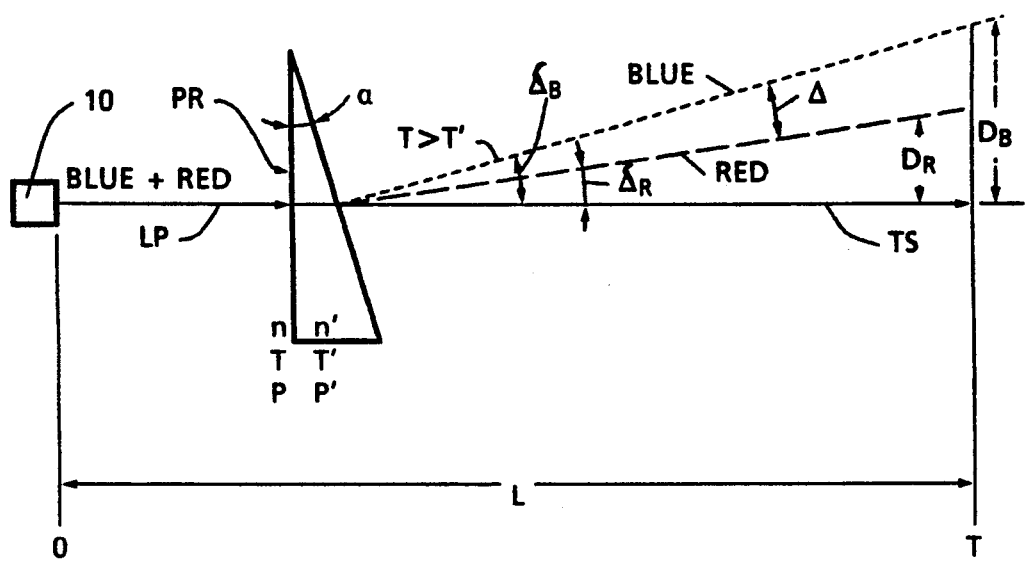
FIG. 2 illustrates some of the operating principles underlying the application of the present invention in which a more truly straight line of sight is determined by an accurate measurement of the physical separation between two color components of a very short duration (or fixed-in-position) light pulse.

Some of the principles underlying the present invention are illustrated in FIG. 2, wherein it is assumed that the atmosphere is approximated by a series of many thin prisms, such as the illustrated prism PR. These prisms should be understood to be in constant three-dimensional motion, and would ordinarily be expected to influence any sight measurements made through the atmosphere due to the differences between state properties, such as temperature and pressure, both inside and outside each of the prisms; thus, each prism will cause light to be both dispersed and refracted. The means and method of the present invention are operable to effectively remove such influencing factors from the calculation of a more truly straight line of sight by effectively "freezing" or fixing in position the effects of atmospheric motion on beam position. According to the invention, such narrow, shortduration pulse effect at the plane of measurement can be provided by using a suitable position fixing means to precisely fix the pulse component separation at that plane. For example, a pulse chopper can be used to shorten the projected pulse to about one micro-second in duration, and one or more such pulses can be projected from the laser 10 to generate the pulse stream LP. Alternatively, such a position fixing means can comprise a CCD camera provided with a computer-operated frame "grabber" (more fully described below) to fix the pulse component separation at the plane of measurement. An algorithm relationship is used for determining an absolute displacement of on color component of the beam from its truly straight line of sight, in order to factor temperature, pressure and density dependencies out of the displacement determination, thereby permitting use of average indexes of refraction such as are readily found in standard text or reference sources.

The laser pulse LP, shown in FIG. 2, contains at least two different components, each having a different discrete wavelength. Preferably, the two discrete wavelengths are far apart from each other in the light spectrum. In the preferred form of the invention, the pulse LP contains a first component or portion having a red wavelength and a second component or portion having a blue wavelength. The portions of the pulse are made collinear when initially generated from the laser as indicated in FIG. 2. However, due to the dispersion effect of the atmosphere, the different wavelength components of the initially collinear beam are dispersed according to the indexes of refraction for the respective wavelengths in the atmosphere along the beam path. This relative dispersion effect between the two color wavelength components is indicated in FIG. 2 by $\Delta$, i.e., the displacement of the red wavelength with respect to the blue wavelength. The deviation angle from a truly straight line of sight TS is indicated by $\delta$, with the blue portion being deviated by an angular amount $\delta_B$ and the red portion being deviated by an angular amount $\delta_R$. Since the two portions deviate different amounts, there will be a physical separation between the two colors after the beam has travelled through the test area. This physical separation is represented by the afore-mentioned $\Delta$. The absolute displacements of each different wavelength portion from the truly straight line of sight along line TS, are indicated in FIG. 2 as $D_B$ and $D_R$ for the blue and red colors respectively.

In order to deduce the displacement factor D (e.g., for either $D_R$ or $D_B$) necessary to correct all measurements made in the test area for atmospheric turbulence, or other factors present in the atmosphere in the test area, the value of $\Delta$ is used. As explained generally above with reference to the equation including $D_1$. The relationship used to calculate this factor is not influenced by factors associated with any dependence of the indexes of refraction on temperature, pressure or the like because this relationship has been developed to factor out such dependencies as will be more fully understood from the following discussion.

Referring to FIG. 2, each of the prisms along the beam path LP, such as prism PR, will be in constant three-dimensional motion, and each of the prisms has an angle α. In addition to such turbulence, the atmospheric properties usually of interest relative to deducing a displacement factor D are: n (index of refraction), T (temperature) and P (pressure) which are each differentiated inside the triangle and outside the triangle in FIG. 2 by using a prime notation to indicate such properties inside the triangle. Differences in these properties between inside and outside the triangle prism illustrated could be expected to influence optical readings made in the test area of beam path LP. However, the means and method of the present invention effectively remove these influences (except of the indexes of refraction) from the relationship used to determine the absolute displacement D from a straight line of sight TS.

The numerical values of absolute displacement D, such as $D_B$ or $D_R$ in FIG. 2, can be evaluated once the indexes of refraction for the atmosphere in the test area are known for the two colors chosen as components of the laser pulse used. Since the absolute displacement is a function of the ratio of the indexes of refraction, any dependence of those values on temperature, pressure, or the like, is factored out, and does not affect the value of absolute displacement. Therefore, average values of n can be used in the above relationship for D. Such average values of n are readily available in standard text and reference books.

In one preferred embodiment of the apparatus used in practicing the invention, the laser is oriented so that the collinear beam is incident on a color CCD camera which is wavelength sensitive at both 1 μm and ½ μm and has 15 micron beam-position measuring sensitivity. It is observed that, by definition, the plane containing the camera is referred to herein as the target plane. A preferred form of the CCD camera is CIDTEK Model CID 512. A computer having software, such as Spiricon, Beamlink Version 1.10, or the like, loaded thereinto is coupled to the output port of the CCD camera. The software in the computer accurately reads the physical separation, Δ, in the x-y co-ordinate system between the discrete wavelengths as sensed by the CCD camera, thereby to determine both the value of Δ and the direction of deflection from the straight line path of the beam. The camera and software take a "snapshot" of the wavelength component positions in which one frame is "grabbed" and physically measured by the software based on the output signals received from the CCD camera. The spatial separation information, Δ, and the direction of deflection of the beam is then relayed as a signal of dispersion measurement to another computer, which may be a special data processor, or the like, such as an IBM type PC-AT computer, into which suitable software has been loaded. The second computer uses the signal of dispersion measurement, Δ, along with the average values of n in the above relationship for D to determine the absolute displacement from true line of sight. The second computer can be a hand-held calculator if a relatively slow rate of calculation is acceptable. This value of absolute deflection D can then be used to correct any other sight measurements made in the test area.

Figure 1:
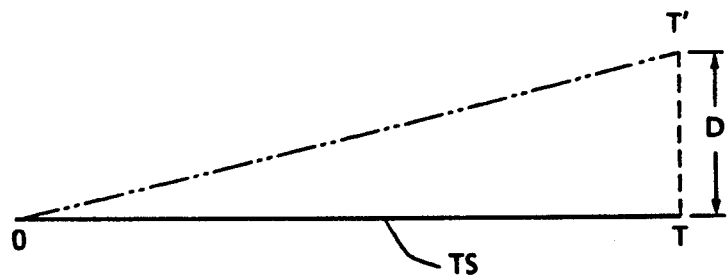
FIG. 1 illustrates a deviation error associated with refractive effects of the atmosphere in an optical measuring technique.
Figure 4:
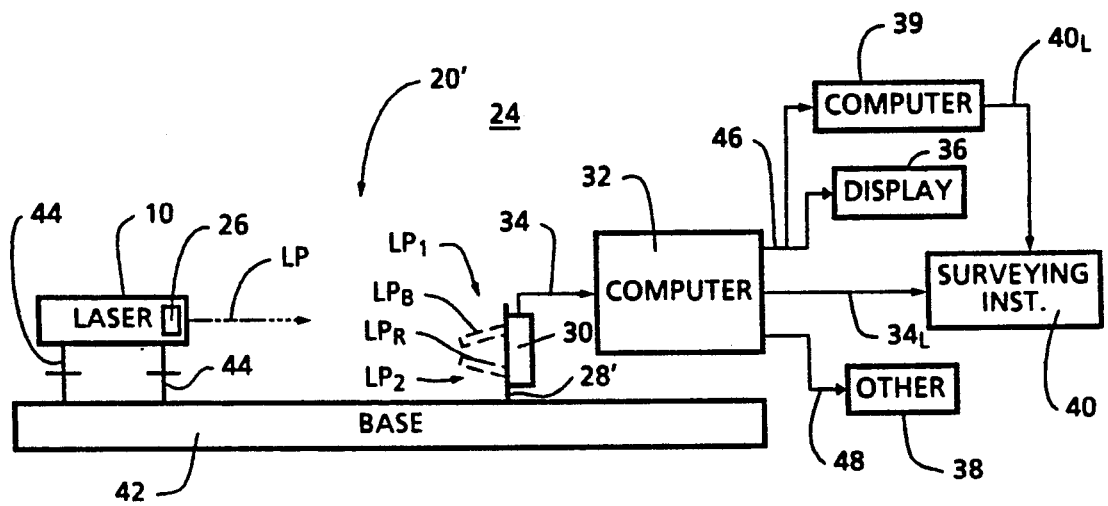
FIG. 4 illustrates a side elevational view of a double-ended set up of apparatus used in another preferred embodiment of the invention for effecting the method of the present invention.
Figure 3:
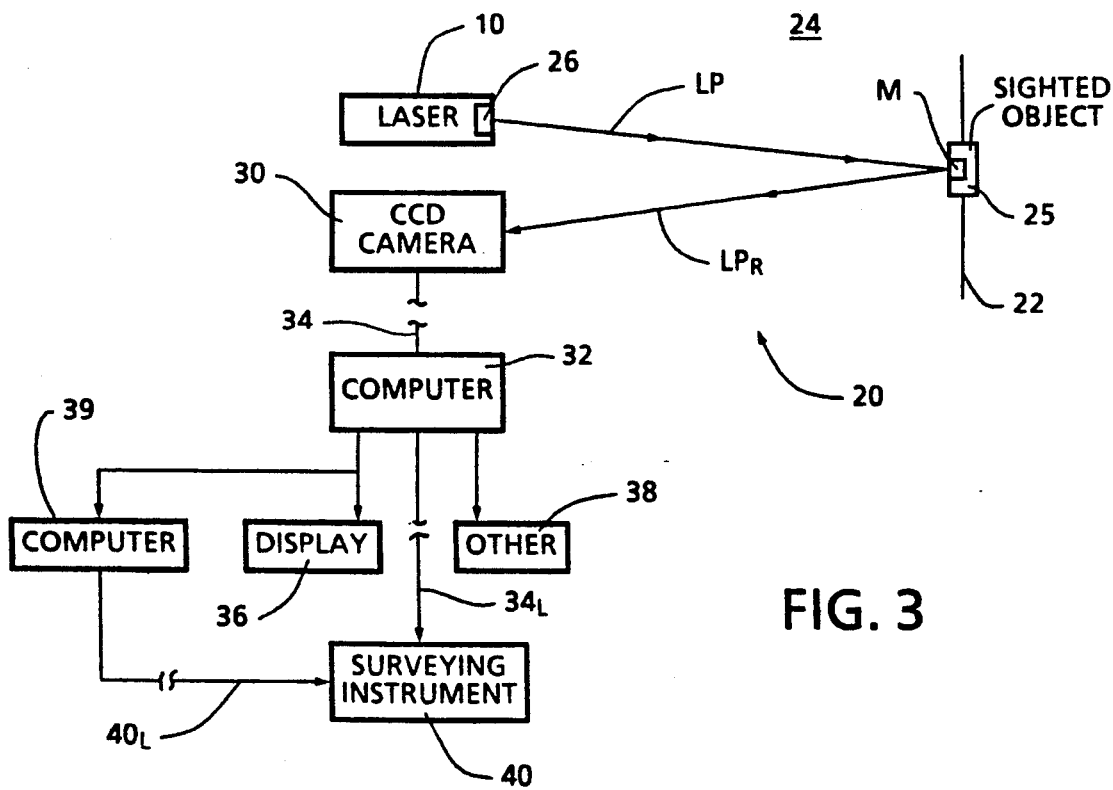
FIG. 3 illustrates a top plan view of a singled-ended set up of apparatus used in a preferred embodiment of the invention for effecting the method of the present invention.

Referring to FIG. 3, there is shown a single-ended set up 20 of the apparatus used for a preferred embodiment of the invention. Laser 10 generates a collinear light pulse LP toward a plane 22 through test area medium 24. A sighted object 25 is located in the plane 22, and reflects a beam $LP_R$ back towards the laser end of the test area. As discussed above, the different wavelength beam component portions will disperse according to the indexes of refraction for the respective portions in the test area. Suitable optics 26 (more fully described below with reference to FIG. 5) are included in the laser such that both discrete wavelengths initially travel coaxially towards the plane 22. As used herein, the term "coaxial" is intended to include collinear, e.g., closely parallel, and superimposed as well. The laser is located and oriented so that the reflected light beam $LP_R$ is incident on a color CCD camera 30 located in the vicinity of the laser, or at least on the same "end" of the test area as the laser. It is important in the present invention to fix the position of the color components at the time their separation Δ is measured. Such a fixing or "freezing" of the beam component positions at the CCD camera 30 can be achieved either by providing a frame "grabber" as discussed in the immediately preceding paragraph, or by providing a chopped output of the laser 10 so that a very short pulse (preferably no more than one-thousandth second in duration) is transmitted to the CCD camera 30. To further enhance the precision of the measurement, the projected beam is made sufficiently thin or narrow, i.e., preferably no more than two millimeters in width or diameter, so that each beam component is fixed at the plane of measurement as a small (>2 mm diameter) image or dot. The output of color CCD camera is coupled to computer 32 by a suitable conventional 16-pin conductor cable 34. The computer has the above-mentioned software that reads the output of the CCD camera and generates a signal of relative dispersion measurement corresponding to the value of Δ. This value of Δ is sent to a display 36 and/or to another output or end-use means 38. A further computer 39 is also coupled to the computer 32 and is loaded with software for calculating D using the value of Δ generated by computer 32. The value of D can also be used to correct readings taken using an instrument 40, which can be a surveying instrument, a satellite tracking means, or the like. The connection between computer 32 and the instrument 40 is shown as a broken line $34_L$ to indicate that the output of the computer 32 should be used in a further calculation, such as by computer 39, as should normally be done before being applied to the readings made using the instrument 40. A connection between computer 39 and instrument 40 is also indicated in FIGS. 3 and 4 by broken line $40_L$ to indicate that the data generated from computer 39, even if fed directly to the instrument 40, should be manipulated before being applied to readings taken using the instrument. The data can be manipulated by a computer, or by a computer chip in the instrument, or can simply be read out, manipulated, and input manually into the instrument 40. A satellite is an example of the sighted object 25. The object 25 can include a means, such as a mirror M, or the like, fixed thereon for reflecting the beam $LP_R$ back to the CCD camera 30.

A double-ended system 20' using an alternative apparatus of the invention is shown in FIG. 4 for determining the value of absolute deflection D of a beam LP in a test area 24. This system includes laser 10 mounted on a rigid base 42 by height-adjusting means, such as jackscrews 44, or the like. It is noted that the single-ended system (described earlier with reference to FIG. 3) can also include height-adjusting means on both the laser and the camera, if suitable. The laser generates a multiple wavelength beam LP that is incident on a plane 28'.

A color CCD camera 30 is located in the plane 28', and the laser 10 is oriented and positioned so that light beam LP is incident on the camera. The camera 30 can also include a height-adjusting means (not shown), if suitable. Again, it is important to note that the desired highly accurate measurement of the separation between the colored beam wavelength components can be achieved by effectively "freezing" the positions of those components with either of the two methods discussed in the immediately preceding paragraph. The CCD camera generates a signal that is coupled by a computer cable 34 to computer 32 in which the CCD camera output signal reading software is loaded. The computer 32 generates a dispersion measurement signal corresponding to $\Delta$, which signal is then fed to computer 39 and/or to display device 36 via suitable cable connectors 46 and 48 or to an instrument 40 via cable connector $34_L$, in the manner discussed above for the single-ended system for calculating and using D, the absolute displacement from the truly straight line of sight. Depending on the properties of the atmosphere in the test area, the light beam LP may be deflected in any direction, but only an upward signal deflection is shown for convenience in FIG. 2. As a matter of convention, an upward deflection is considered herein as a positive deflection, with the red and blue wavelengths dispersing from each other and being indicated (in FIG. 4) by $LP_R$ and $LP_B$ respectively.

The overall means of the invention for determining a straight line of sight thus comprises a laser, such as laser 10, that generates a pulse LP containing at least two discrete wavelengths $LP_R$ and $LP_B$, that in the preferred embodiment are superimposed by optics 26 on a dispersion measuring means that includes a CCD camera 30 and a computer 32 that accurately measure any physical separation between the fixed-in-position (by either short pulse duration or by a frame "grabber") red and the blue wavelengths incident on the camera, and generate a dispersion measurement signal corresponding to $\Delta$. This system then further includes a converting means which includes a second computer 39 for converting the dispersion separation $\Delta$ into an absolute displacement D of the pulse LP from its straight line of sight (absent the effects of dispersion). The value of absolute displacement is then used to correct readings from instruments, such as surveying instruments 40, or the like.

As mentioned briefly above, the beam LP can be generated by a chopped output from a HeNe laser which is simultaneously lasing in multiple wavelengths such as red, green and orange, or more simply by using a frequency doubled YAG laser which has compatible energy at both 1.06 $\mu$m and 0.53 $\mu$m. The discrete wavelengths should be far apart, but should be within the range of the CCD camera, preferably in a range of 0.4 $\mu$m to 1.2 $\mu$m. The multiple wavelength color pulsed laser beam is then manipulated by optics, such as optics 26, to reduce beam divergence and is directed through the atmosphere to the CCD camera. It should be understood that when more than two discrete wavelengths are generated by the laser, each color component wavelength will produce a discrete position signal on the CCD camera, thus, a line best fitted to intersect those respective positions will more accurately indicate the direction of deflection of the projected beam, than such direction might be indicated by only a two-wavelength beam. Accordingly, when reference is made herein to a multiple-colored beam, the intent is to encompass a beam of two or more different wavelengths.

Figure 5:
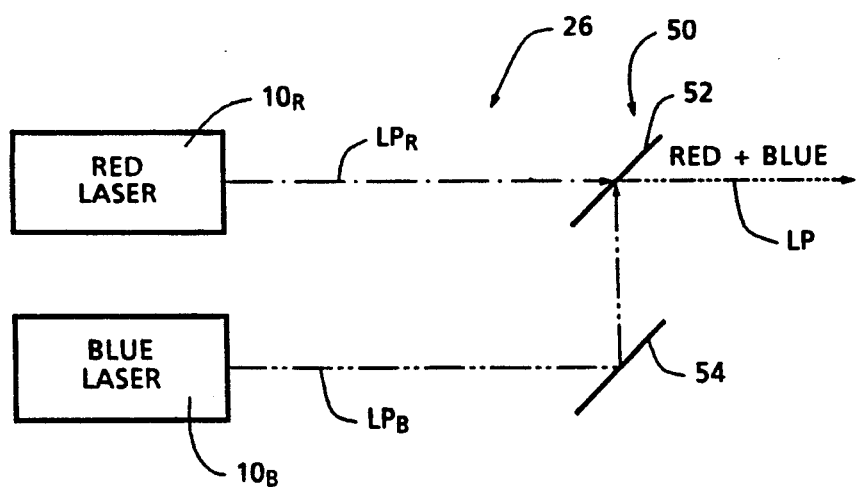
FIG. 5 illustrates an optics system used in conjunction with the multiple-color laser of the preferred embodiment to combine into a co-linear beam two discrete wavelength components of a laser light pulse, such as red and blue wavelength components.

The optics 26 are arranged such that both colors (in the preferred embodiments) travel coaxially through the atmosphere. As illustrated in FIG. 5, a blue beam $LP_B$ generated by a blue laser, such as a HeCd laser $10_B$ in deep blue at 0.45 $\mu$m wavelength, and a red beam $LP_R$, generated by a red laser $10_R$, such as a HeNe laser at 1.15 $\mu$m wavelength in the infrared, can be combined to form a collinear beam LP. The overall optics system includes a beam combining system 50. A preferred form of beam combining system 50 is illustrated in FIG. 5 as including a mirror 54 and a beam combiner 52. The red and blue beams are combined by the beam combiner. Several forms of beam combiners are available, such as either a half-silvered mirror, a suitable conventional dichroic device, or the like. The beam LP emerging from the beam combiner has the discrete portions thereof positioned collinear, i.e., either coaxial or closely parallel.

Figure 6:
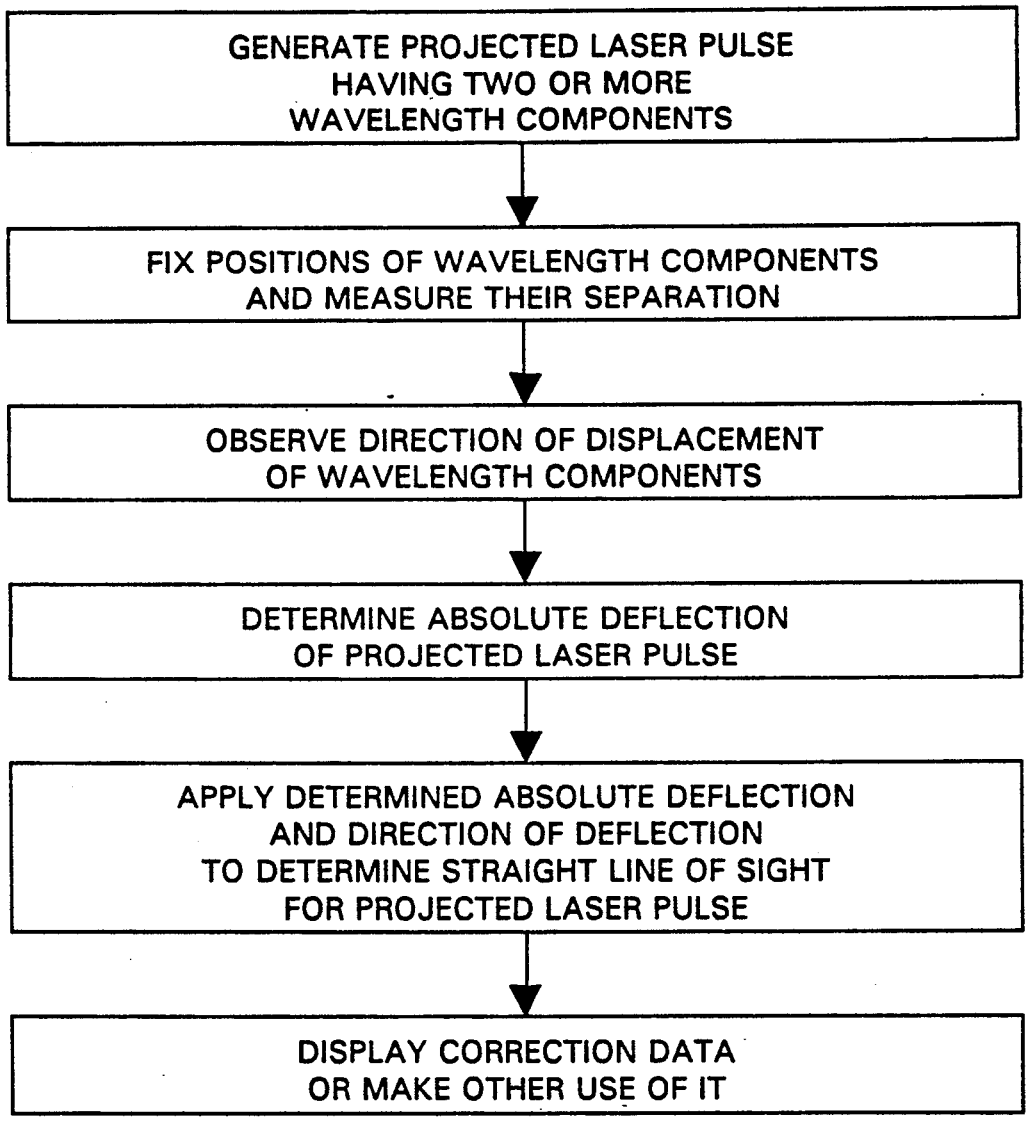
FIG. 6 is a flow chart illustrating the method of the present invention and the use of a nearly straight line of sight determined by such technique.

The method according to the present invention is illustrated in FIG. 6, and includes the steps of generating a multiple color pulse, which in the preferred embodiment is a two-color pulse, LP, as described with reference to the embodiments shown in FIGS. 3 and 4, and impinge that pulse against a CCD camera. The physical separation $\Delta$ of the color components of the projected pulse with respect to each other is accurately measured by precisely fixing the positions of the color components at the CCD camera while their separation is measured. The measured separation $\Delta$ is converted to an absolute displacement. This absolute displacement is then either displayed or used to correct other measurements, or both.

While the method of the present invention can be applied to any procedure that requires precision pointing accuracy with at least some portion of the sighting occurring through an atmosphere subject to light diffusing effects, it is particularly useful in the fields of geodetic measurements such as those employing lasers and optical instruments for surveying.

It is understood that while certain forms of the present invention have been illustrated and described herein, it is not to be limited to the specific forms or arrangements of parts described and shown.

What is claimed is:

1. A means for determining a straight line of sight comprising:
   A) a laser which generates and projects a pulse containing at least two discrete wavelength components;
   B) position fixing means for fixing in position said wavelength components at a predetermined plane where relative separation between said wavelength components can be measured;
   C) dispersion effect measuring means for accurately measuring the physical separation between said fixed-in-position discrete wavelength components, and for generating a signal of separation measurement, said laser being oriented so that said pulse is incident on said dispersion effect measuring means; and
   D) converting means connected to said dispersion effect measuring means to receive said signal and to convert said separation measurement signal into an absolute displacement D from a straight line of sight for one wavelength component of said projected pulse, whereby the position of said straight line of sight is accurately determined.

2. The means defined in claim 1 wherein said dispersion effect measuring means includes a CCD camera, a wavelength component separation measuring means computer connected to said CCD camera, and software means in said computer for grabbing one frame of a picture of the wavelength components taken by said CCD camera thereby to accurately fix the positions of said components and measure the physical separation between said discrete wavelength components for generating said signal of separation measurement, and wherein said converting means includes a second computer operatively connected to said dispersion effect measuring means computer.

3. The means defined in claim 1 wherein said converting means converts said signal of separation measurement into absolute displacement of one wavelength component of the pulse from straight line of sight for the pulse according to the relationship $$D_1 \Delta/(1-n_1/n_2)$$

where $D_1$ is the absolute displacement from the true line of sight of a first component of the pulse having a first wavelength, $n_1$ is a refractive index of a medium through which said pulse is propagating for the first component of the pulse, $n_2$ is a refractive index of the medium through which said pulse is propagating for a second component of the pulse, and $\Delta$ is said signal of dispersion measurement at a plane of measurement.

4. The means defined in claim 1 wherein said laser includes a frequency doubled YAG laser which has comparable energy at both 1.06 $\mu$m and 0.53 $\mu$m.

5. The means defined in claim 1 wherein said laser includes a HeNe laser which simultaneously lases red, green and orange.

6. The means defined in claim 1 further including an optics system for aligning both discrete wavelengths to travel coaxially from said laser.

7. The means defined in claim 2 wherein said CCD camera has a sensitivity at both 1 $\mu$m and at $\frac{1}{2}$ $\mu$m while having a 15 micron position sensitivity.

8. The means defined in claim 1 further including a surveying instrument, said surveying instrument including means for utilizing said signal corresponding to absolute displacement of a component of said projected laser pulse, wherein said converting means is connected to said surveying instrument and is operable to correct said signal corresponding to utilization by said surveying instrument of said absolute displacement.

9. The means defined in claim 1 wherein said discrete wavelength components are far enough apart in the light spectrum to produce distinctly different colors, and wherein said discrete wavelengths are in a range of between 0.4 $\mu$m and 1.2 $\mu$m apart.

10. The means defined in claim 1 further including a satellite that is positioned to have said projected laser pulse incident thereon, and satellite tracking means operably connected to receive and utilize said absolute displacement to determine a straight line of sight between the laser and the satellite.

11. The means defined in claim 10 wherein said converting means is connected to said satellite tracking means and corrects location measurements made by said satellite tracking means.

12. The means defined in claim 1 further including a test area through which said pulse is projected, wherein said laser is located at one end of said test area and said dispersion effect measuring means is located at another end of said test area.

13. The means defined in claim 1 further including a test area through which said pulse is projected, wherein said laser and said dispersion effect measuring means are located at one end of said test area.

14. A method of determining a straight line of sight comprising the steps of:
A) generating and projecting a laser pulse having at least two discrete wavelength components, said components being substantially collinear when projected;
B) accurately fixing the positions of said wavelength components of said pulse at a predetermined plane;
C) measuring dispersion effect displacement between said discrete wavelength components by measuring the physical separation between said discrete wavelength components at said plane and generating a signal based on the absolute displacement of said components of the laser pulse from said straight line of sight; and
D) converting said measurement of physical separation into absolute displacement of one wavelength component of the pulse from its straight line of sight.

15. The method defined in claim 14 further including a step of making a measurement of the wavelength components relative separation in the vicinity of said straight line of sight for a component of the laser pulse and correcting that measurement to determine a straight line of sight for that component.

16. The method defined in claim 14 wherein the step of converting said separation measurement into absolute displacement of the component of said pulse from its straight line of sight uses the relationship $$D_1 = \Delta/(1-n_1/n_2)$$

where $D_1$ is the absolute displacement from the straight line of sight of a first component of the pulse having a first wavelength, $n_1$ is a refractive index of a medium through which said pulse is propagating for the first component of the pulse, $n_2$ is a refractive index of the medium through which said pulse is propagating for a second wavelength component of the pulse, and $\Delta$ is said physical separation between said discrete wavelength components at a plane of measurement.

17. The method defined in claim 15 wherein the corrected measurement is used for tracking a satellite.

* * * * *